Nov. 4, 1952 R. G. LE TOURNEAU 2,616,301
GEAR ARRANGEMENT FOR TRANSMISSIONS
Filed Jan. 18, 1950 2 SHEETS—SHEET 1

INVENTOR:
R. G. LeTourneau
BY
J. D. Copeland Jr.
AGENT

Nov. 4, 1952  R. G. LE TOURNEAU  2,616,301
GEAR ARRANGEMENT FOR TRANSMISSIONS
Filed Jan. 18, 1950  2 SHEETS—SHEET 2
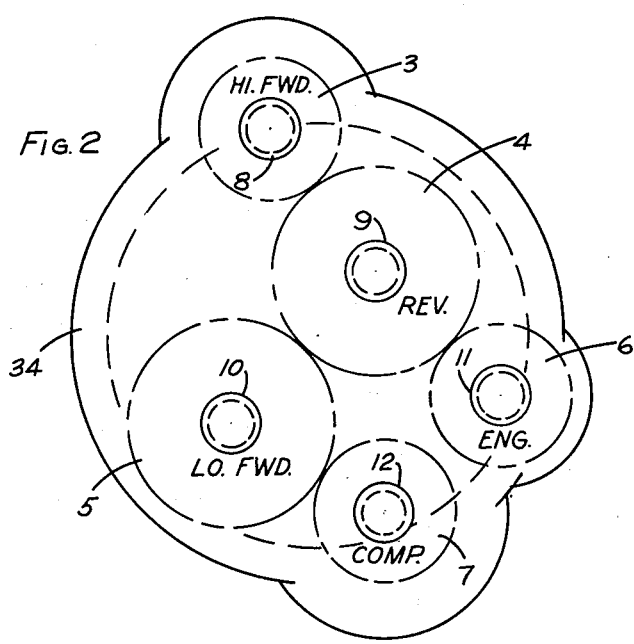
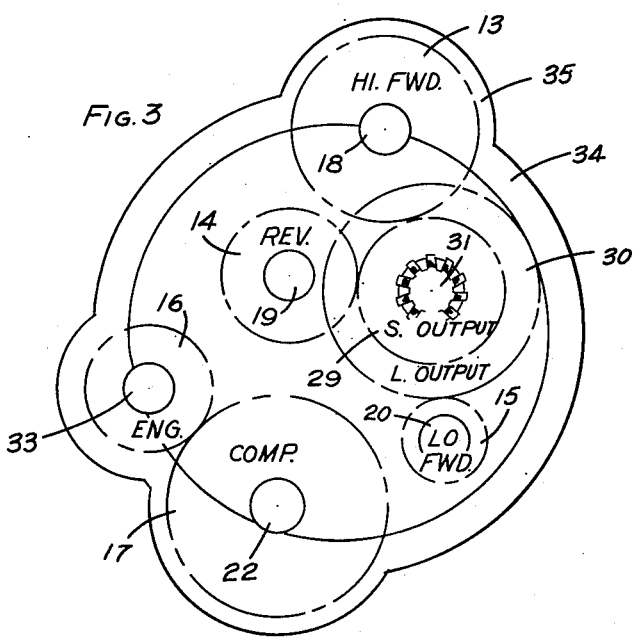
INVENTOR:
R. G. LeTourneau
BY
J. D. Copeland Jr.
AGENT Patented Nov. 4, 1952

2,616,301

UNITED STATES PATENT OFFICE 2,616,301

GEAR ARRANGEMENT FOR TRANSMISSIONS

Robert G. Le Tourneau, Longview, Tex.

Application January 18, 1950, Serial No. 139,263

5 Claims. (Cl. 74—360)

This invention relates generally to transmissions and more particularly to transmissions with multiple stage forward and reverse speeds.

The primary object of this invention is to provide a transmission having multiple stage forward speed ratios and having multiple stage reverse speeds of a different ratio.

Another object of this invention is to provide a constant mesh transmission in which each of the stages include a sleeve gear operated gear train and a shaft gear operated train and in which the reverse speeds are obtained thru a different shaft gear operated gear train than the forward speeds.

A further object of this invention is to provide a gear arrangement in which the shaft gears are grouped in a compact circle about the output shaft so that both the shaft gears and sleeve gears will occupy the smallest possible space and may consequently be enclosed by a case of minimum volume when used as a removable bolt-on type transmission.

Other objects and advantages will become apparent from a perusal of the following specification and the accompanying drawings, in which:

Fig. 2 is an end view of the clutch end of a bolt-on transmission employing this gear sequence showing the compact grouping of the gears.

Fig. 3 is an end view of the mounting end of the transmission of Fig. 2.

Figure 1:
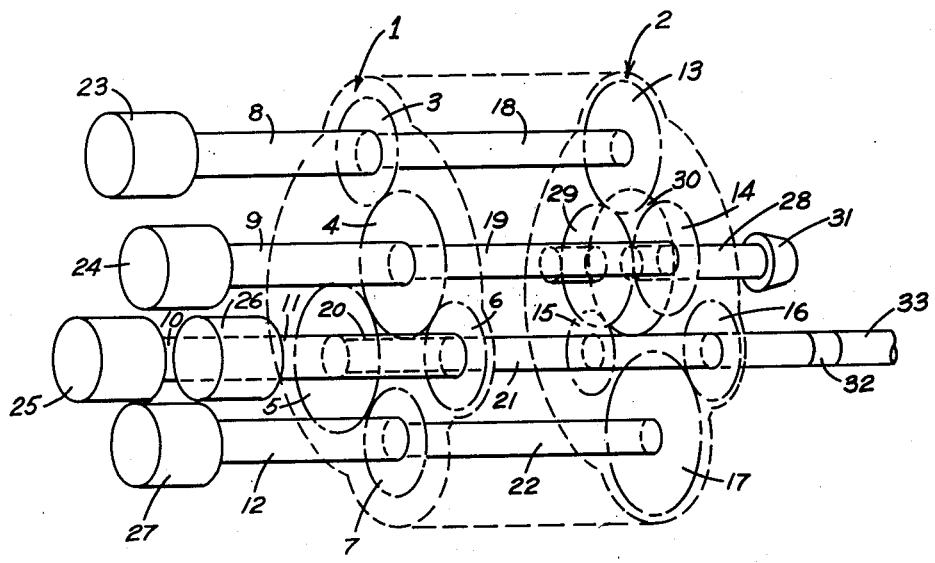
Fig. 1 is a diagrammatic perspective view illustrating the gear trains of both the sleeve and shaft gears.

Referring now to the drawings, in Fig. 1 the reference numeral 1 indicates generally the sleeve gear train and numeral 2 the shaft gear train. These two groupings are so named since the individual gears 3—7 revolve with hollow sleeves 8—12 and gears 13—17 revolve with solid shafts 18—22. The force and motion is transmitted between the shaft and sleeve thru the medium of the air operated clutch units 23—27 in the manner described in detail in co-pending application Serial No. 735,484, filed March 18, 1947, now U. S. Patent No. 2,553,376. The output shaft 28 contains a small gear 29 and a large gear 30 which both revolve with the shaft when either receives torque from either of the gears 13—15. Helical bevel gear 31 is on the same shaft 28 and consequently turns with either output gear and subsequently delivers power to a final drive mechanism. Shaft 21 is spline connected thru adaptor coupling 32 to a take-off shaft 33 from the power plant and this shaft acts as the power input to the transmission.

When the engine clutch 26 is engaged, the sleeve gear 6 turns at the same rotary speed as shaft 33, but the speed transmitted to shaft 9 is reduced greatly due to the gear ratio between the large gear 4 and gear 6. This same speed is delivered to shaft 19 when clutch 24 is engaged. However, shaft 19 contains a gear 14 which meshes with a small output gear 29 so that the speed of shaft 28 is again stepped up. This constitutes one speed of the reverse gear output. The other reverse speed is obtained by engaging clutches 27 and 24 so that the sleeve gear train becomes 7—5—4 and the shaft gear is again 14, but at this moment it is running at a speed of approximately one-half its former.

In the former application (735,484), there were two reverse shafts and consequently four reverse speeds. These reverse speeds corresponded to the four forward speeds of the vehicle. In the present invention, there are four forward speeds, but the two reverse speeds now correspond approximately to the 2nd and 3rd speeds of the forward. This is desirable since in tractor work four reverse speeds are not essential, but a faster reverse speed than the 2nd forward speed is useful. In order to eliminate one shaft and one set of sleeve and shaft gears (high reverse) from the former transmission and at the same time evolve an intermediate set of reverse speeds, it is necessary to engage the shaft gear of the remaining reverse shaft with the smaller output gear. Since the low forward gear 15 meshes with a large output gear 30 and the reverse gear 14 meshes with a small output gear 29, the reverse output will be at a higher speed in each instance than the low forward output; i. e. when powered from either engine gear 6 or compound gear 7.

The remaining gear sequences in this transmission are substantially as in the former application: engine gear 16 is in mesh with compound gear 17 which has approximately twice as many teeth; both these shaft gears are connected thru clutches 26 and 27 to their corresponding sleeve gears 6 and 7. These latter gears selectively furnish power to the sleeve gear train 1. When either clutch such as 27 is engaged, all of the gears 3—7 in the sleeve gear train revolve, and if clutch 26 is engaged they would revolve at approximately twice the speed. When a speed selection clutch such as 23 is engaged, shaft 18 would then turn at the same rate as shaft 8 and gear 3. This speed would be increased in transmission by gears 13 and 29 to output shaft 28, and the ultimate final speed taken off thru gear 31 would correspond to the third forward speed.

During this sequence, gears 14 and 15 and shafts 19 and 20 would be idling in accordance with the speed under power being delivered to output shaft 28.

In Figs. 2 and 3, it will be seen that case 34 is generally circular in shape which will facilitate machining but has protrusions 35 to accommodate those gears which will not fit in the circular enclosure and that the overall volume thus obtained includes a minimum of wasted space. The elimination of one reverse shaft and yet retaining the same practical utility to the transmission contributed to the overall reduced volume. To obtain a generally circular case and yet one with a minimum volume, the case 34 is made to enclose as many gears of the two gear trains as possible, then the gears which cannot be brought into this circle will be accommodated by welded or cast protrusions which inclose them; a gear which is in mesh with these protruding gears (such as low forward gear 5) is "walked" around the gear teeth (of gear 7 since its corresponding gear 17 is protruding) until it is in mesh with another gear of its train. Actually the overall design takes in many factors such as desired tooth ratio, strength, etc. which go with this feature to produce an enclosed transmission of generally circular shape but minimum volume.

From the foregoing description, it will be readily seen that there has been produced such a device as substantially fulfills the objects of the invention as set forth herein.

While this specification sets forth in detail the present and preferred construction of the device, still in practice such deviation from such detail may be resorted to as do not form a departure from the spirit of the invention as defined by the appended claims.

Having thus described my invention, the following is claimed as new and useful, and upon which Letters Patent is desired:

1. A transmission comprising: a case; a pair of gear trains mounted within said case; a series of parallel shafts mounted in said case and projecting therefrom; one of said gear trains having its gears mounted on said shafts; a series of parallel sleeves mounted in said case and projecting therefrom and the other of said gear trains having its gears mounted on said sleeves; each of said sleeves being aligned upon and surrounding one end of a corresponding one of said shafts; a series of clutches associated with said sleeves and shafts, each separate one of said clutches being associated with a corresponding separate one of said aligned shafts and sleeves for binding its associated shaft and sleeve for joint rotation; a shaft gear adapted to be driven by an engine; a larger compound gear driven by said engine gear; said sleeve mounted gear train including corresponding non-meshing engine and compound gears and a forward gear and a reverse gear meshing with each other; said forward sleeve mounted gear meshing with said compound sleeve mounted gear; said reverse sleeve mounted gear meshing with said sleeve mounted engine gear; an output shaft; a large gear and a small gear mounted on said output shaft; said shaft mounted gear train including a forward gear adapted to rotate with said sleeve mounted forward gear when the connecting clutch is engaged; said shaft mounted forward gear meshing with said large gear; said shaft mounted gear train including a reverse gear adapted to rotate with said sleeve mounted reverse gear when their connecting clutch is engaged; said reverse and forward shaft mounted gears being adapted to rotate at approximately the same speed; said shaft mounted reverse gear meshing with said small gear.

2. A transmission comprising: a case; a pair of gear trains mounted within said case; a series of parallel shafts mounted in said case and projecting therefrom; one of said gear trains having its gears mounted on said shafts; a series of parallel sleeves mounted in said case and projecting therefrom and the other of said gear trains having its gears mounted on said sleeves; each of said sleeves being aligned upon and surrounding one end of a corresponding one of said shafts; a series of clutches associated with said shafts; a series of clutches associated with the external ends of said sleeves and shafts, each separate one of said clutches being associated with a corresponding separate one of said aligned shafts and sleeves for binding its associated shaft and sleeve for joint rotation selectively; a shaft gear adapted to be driven by an external power source; a larger compound gear driven by said power gear; said sleeve mounted gear train including corresponding non-meshing power and compound gears and a forward gear and a reverse gear meshing with each other; said forward sleeve mounted gear meshing with said compound sleeve mounted gear; said reverse sleeve mounted gear meshing with said sleeve mounted power gear; an output shaft; a large gear and a small gear mounted on said output shaft; said shaft mounted gear train including a forward gear adapted to rotate with said sleeve mounted forward gear when the connecting clutch is engaged; said shaft mounted forward gear meshing with said large gear; said shaft mounted gear train including a reverse gear adapted to rotate with said sleeve mounted reverse gear when their connecting clutch is engaged; said reverse and forward shaft mounted gears being adapted to rotate at approximately the same speed; said shaft mounted reverse gear meshing with said small gear.

3. A transmission as in claim 1, said case being mainly circular in shape, protrusions extending from the circumference of said case for inclusion of certain of said shaft and sleeve gears, the gears meshing with said protruding gears being rotated around said protruding gear shaft until as nearly as possible included within said circular case.

4. A transmission as in claim 1, said case being generally circular and unitary, said clutches being mounted on said sleeves and extending beyond the enclosure of the case.

5. A transmission as in claim 1, said clutches being mounted on said sleeves and extending beyond the enclosure of the case, said case being filled with oil, and said clutches being oil free.

ROBERT G. LeTOURNEAU.

REFERENCES CITED

The following references are of record in the file of this patent:

UNITED STATES PATENTS

| Number | Name | Date |
|---|---|---|
| 1,589,267 | Toomey | June 15, 1926 |
| 1,993,983 | Woodward | Mar. 12, 1935 |

FOREIGN PATENTS

| Number | Country | Date |
|---|---|---|
| 254,415 | Great Britain | July 8, 1926 |
| 462,365 | Great Britain | Mar. 8, 1937 |
| 523,771 | Great Britain | July 23, 1940 |